United States Patent
Rodousakis et al.

(10) Patent No.: US 7,195,285 B2
(45) Date of Patent: Mar. 27, 2007

(54) CONNECTION ARRANGEMENT TO CONNECT TWO FLEXIBLE TANKS OF AN AIRCRAFT

(75) Inventors: Eleftherios Rodousakis, Munich (DE); Harald Kiowsky, Germerswang (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 92 days.

(21) Appl. No.: 10/612,108

(22) Filed: Jul. 2, 2003

(65) Prior Publication Data

US 2005/0034781 A1  Feb. 17, 2005

(30) Foreign Application Priority Data

Jul. 3, 2002 (DE) .......................... 102 29 803

(51) Int. Cl.
*F16L 37/08* (2006.01)
*B65D 21/02* (2006.01)
*B65D 37/00* (2006.01)

(52) U.S. Cl. .................. 285/305; 285/308; 285/319; 220/4.15; 220/23.4; 220/501; 220/507; 220/562; 220/564; 220/905

(58) Field of Classification Search ............... 285/305, 285/308, 319, 200, 210, 140.1; 220/23.2, 220/23.4, 4.12–4.15, 501, 507, 562, 564, 220/905
See application file for complete search history.

(56) References Cited

U.S. PATENT DOCUMENTS

| 2,171,972 | A | * | 9/1939 | Debor ...................... 220/584 |
| 2,441,009 | A | * | 5/1948 | Cunningham ............... 285/200 |
| 2,459,747 | A | * | 1/1949 | Kolbe ........................ 285/200 |
| 2,630,340 | A | | 3/1953 | Gaylard et al. |
| 3,035,797 | A | | 5/1962 | Neuschotz |
| 3,239,255 | A | * | 3/1966 | Murcott ...................... 403/329 |
| 4,004,734 | A | * | 1/1977 | Hadtke ......................... 239/58 |
| 4,307,744 | A | * | 12/1981 | Marrison .................. 137/68.11 |
| 4,735,440 | A | * | 4/1988 | Sauer ......................... 285/110 |
| 5,048,874 | A | * | 9/1991 | Ohlsson ..................... 285/307 |
| 5,123,557 | A | | 6/1992 | Drawbaugh |
| 5,577,630 | A | * | 11/1996 | Blair et al. ................. 220/581 |
| 5,649,638 | A | * | 7/1997 | Roy et al. .................. 220/4.26 |
| 5,863,425 | A | * | 1/1999 | Herlehy et al. ............. 210/169 |
| 6,026,855 | A | * | 2/2000 | Jackson et al. ............. 137/592 |
| 6,622,879 | B1 | * | 9/2003 | Carter ....................... 220/23.4 |
| 6,640,832 | B2 | * | 11/2003 | Walter ................... 137/565.01 |
| 6,725,507 | B2 | * | 4/2004 | Reynard ...................... 24/287 |

FOREIGN PATENT DOCUMENTS

| DE | 463 993 C | 8/1928 |
| GB | 552 722 | 4/1943 |
| GB | 664 201 | 1/1952 |

OTHER PUBLICATIONS

Search Report of EP 03 01 4894 and translation thereof (3 pages).

* cited by examiner

*Primary Examiner*—James M. Hewitt
(74) *Attorney, Agent, or Firm*—Darby & Darby

(57) ABSTRACT

A connection arrangement for detachably connecting a first flexible tank and a second flexible tank in an aircraft includes a latching device, a first tubular connecting element attached to the first tank, and a second tubular connecting element attached to the second tank. The first and the second connecting elements are detachably connected to each other using the latching device. In a connected state of the connecting elements, fluid exchange can take place between the first and the second tanks via the first and the second connecting elements, the latching device is disposed inside one of the first and second flexible tanks and is actuatable from outside the respective flexible tank.

14 Claims, 2 Drawing Sheets

CONNECTION ARRANGEMENT TO CONNECT TWO FLEXIBLE TANKS OF AN AIRCRAFT

Priority is claimed to German patent application no. DE 102 29 803.3, filed on Jul. 3, 2002, the subject matter of which is incorporated by reference herein.

BACKGROUND

The present invention relates to a connection arrangement to detachably connect two flexible tanks in aircraft.

It is a known practice to employ flexible tanks of an aircraft such as, for instance, helicopters. In particular, due to design-related space constraints, several small tanks that are connected to each other are often used instead of one large tank. Due to the tight space available, it is frequently difficult to install such a plurality of tanks. Moreover, it would be desirable, for example, in order to perform repair work, to be able to simply remove one or all of the tanks so as to better gain access to the repair sites in question or to have more space available for carrying out the repair.

SUMMARY OF THE INVENTION

An objective of the present invention is to provide a connection arrangement to connect two flexible tanks in aircraft which makes it possible to easily install and to easily remove at least one flexible tank while keeping the set-up simple and cost-effective.

The present invention provides a connection arrangement to detachably connect a first flexible tank (1) and a second flexible tank (2) in aircraft, including a first tubular connecting element (8) attached to the first tank (1), a second tubular connecting element (18) attached to the second tank (2) and a latching device (16). The first and the second connecting elements (8, 18) are detachably connected to each other by means of the latching device (16). In the installed state, fluid exchange can take place between the first and the second tanks (1, 2) via the first and the second connecting elements (8, 18). The latching device (16) is situated inside one of the two tanks (1, 2) when the tanks are connected and can be actuated indirectly from the outside of the tank through this flexible tank.

The connection arrangement according to the invention to detachably connect two flexible tanks in aircraft makes it possible to greatly simplify the installation or removal of the flexible tanks. For this purpose, the connection arrangement according to the invention comprises a first tubular connecting element attached to the first tank, a second tubular connecting element attached to the second tank and a latching device. This latching device detachably connects the first and the second connecting elements to each other. Here, in the installed, that is to say, connected state of the tanks, fluid exchange takes place between the two flexible tanks via the first and the second connecting elements. Furthermore, the latching device is situated inside one of the two flexible tanks and it can be actuated from the outside of this flexible tank through the flexible tank. In other words, the latching device is actuated indirectly through the flexible tank, a process in which the latching device cannot be directly touched, but rather, the latching device can only be felt and actuated through the flexible jacket of the tank. Another advantage of the connection arrangement according to the invention between two tanks is that the installation space that is available for the tank can be fully utilized since it is not necessary to leave a gap between the two flexible tanks as is the case in the state of the art. Through the arrangement of the latching device inside one tank, two adjacent tanks can then be positioned as closely as possible next to each other.

Preferably, in its installed state, the first tubular connecting element projects into the second tank.

Advantageously, the latching device is configured as a spring element, especially one having an undercut, the spring element being attached to either the first or the second connecting element. Particularly preferably, the latching device is made up of two spring elements that are attached to the first tubular connecting element and that are positioned across from each other by an angle of 180°. This allows an easy grasping, for example, with the thumb and the index finger, from the outside of the flexible tank through said tank since, in the installed state, the latching device is covered by the flexible tank and is not visible.

In order to attain a simple and reliable connection of the first tubular connecting element to the tank, the first connecting element preferably has an attachment flange that can be secured to a tank fitting of the first flexible tank.

In order to achieve the smallest possible number of components, according to another preferred embodiment of the invention, the tank fitting is formed integrally with the first tubular connecting element. In other words, the tank fitting and the first connecting element constitute a one-piece component.

For purposes of imparting improved stability to the flexible tanks, they are separated by a rib.

It is also preferable for the second flexible tank to be attached directly to the second tubular connecting element, thus likewise translating into an especially small number of parts.

In order to need as little installation space as possible in the axial direction of the tubular connecting element, the second tubular connecting element is preferably attached to the second flexible tank in such a way that the second tubular connecting element projects into the inside of the tank.

In a likewise preferred manner, there is a sealing element positioned between the first and the second tubular connecting elements.

It should be pointed out that it is, of course, possible to connect a plurality of flexible tanks by means of the connection arrangement according to the invention. In this context, there is preferably always a first as well as a second tubular connecting element on a flexible tank.

BRIEF DESCRIPTION OF THE DRAWINGS

Below, an embodiment of the invention is described with reference being made to the accompanying drawings, in which.

DETAILED DESCRIPTION

Figure 1:
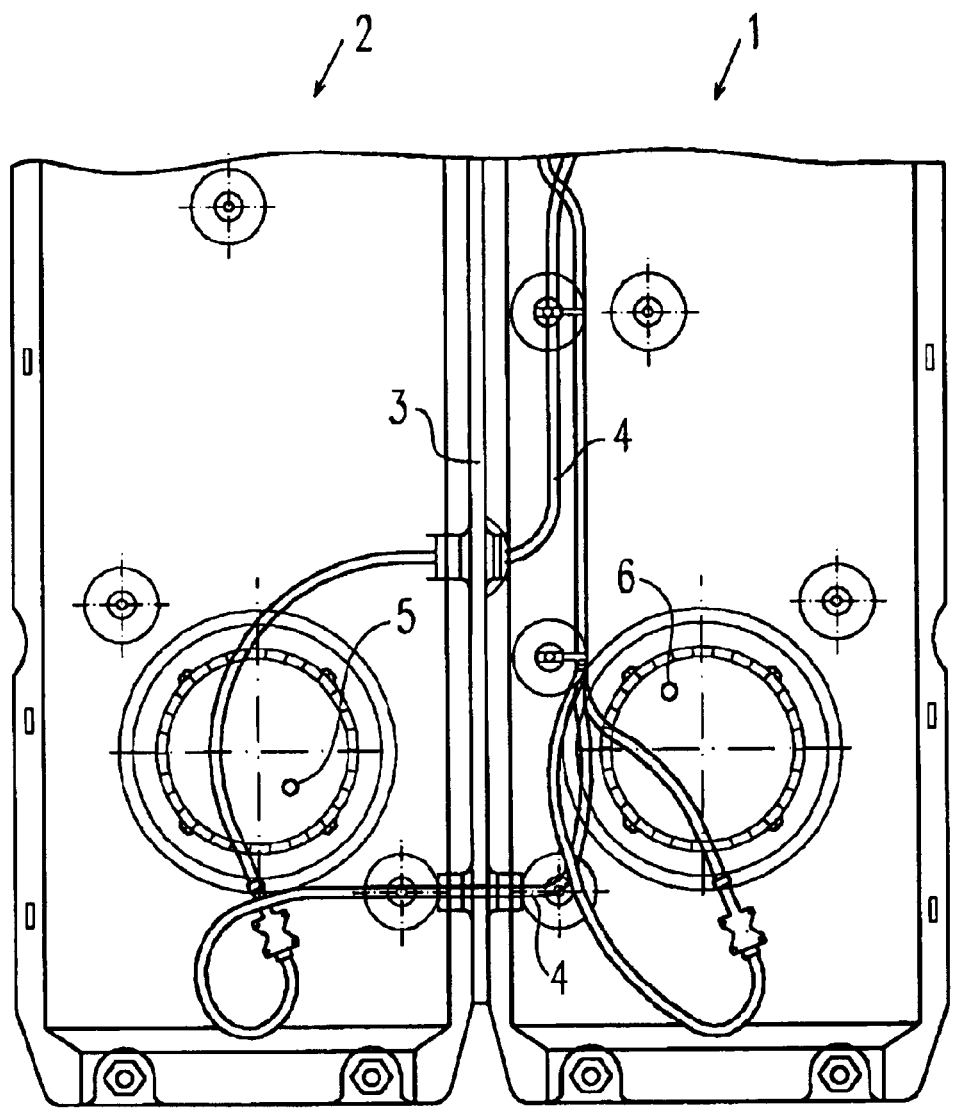
FIG. 1 shows a schematic top view of an arrangement of two flexible tanks.
Figure 2:
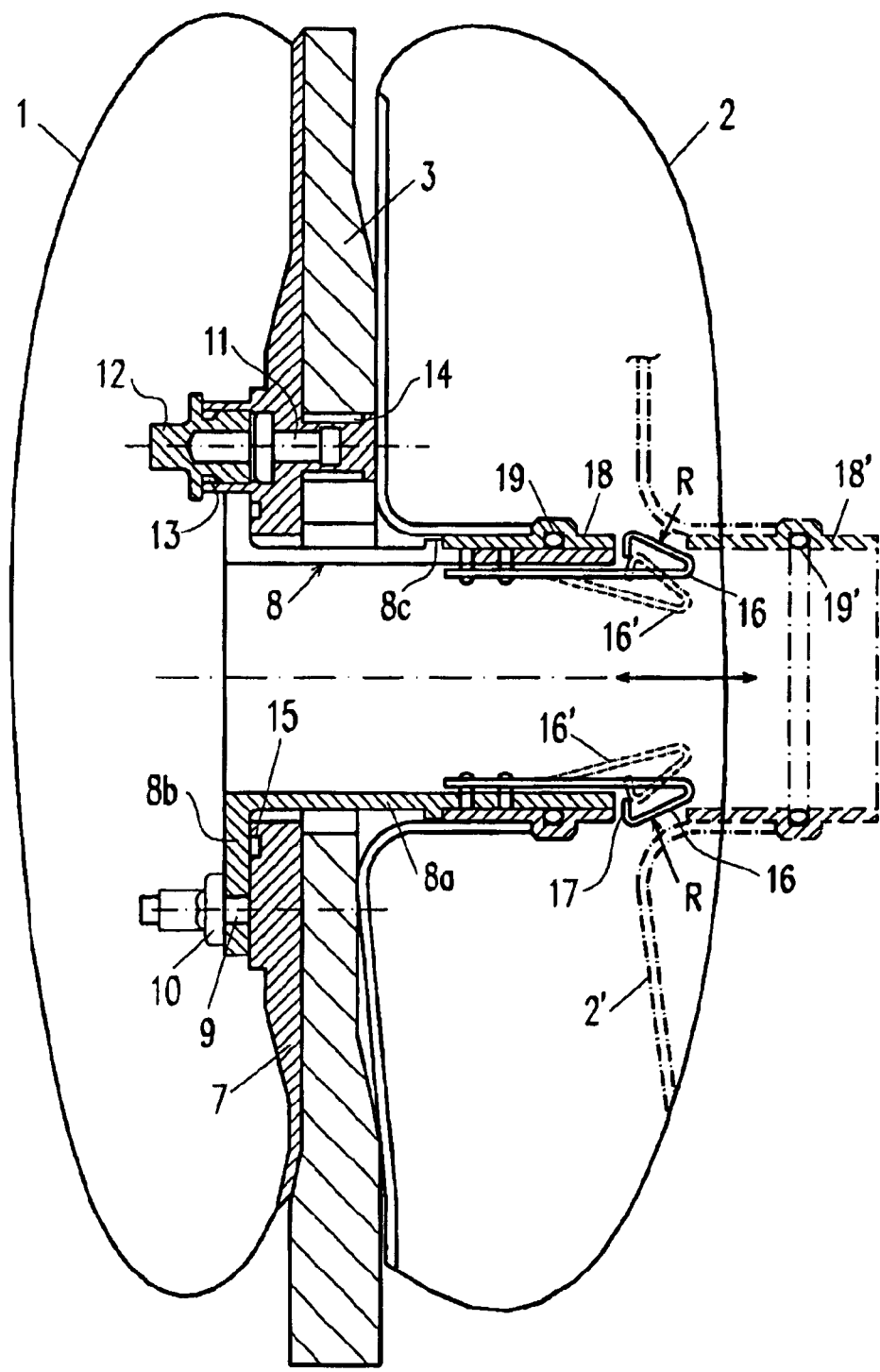
FIG. 2 shows a schematic side view of a connection arrangement according to an embodiment of the invention.

As can be seen in FIGS. 1 and 2, a first flexible tank 1 and a second flexible tank 2 for an aircraft are arranged next to each other. Here, both tanks 1, 2 are separated from each other by a rib 3. In their filled state, both flexible tanks 1, 2 lie against the rib 3. As depicted in FIG. 1, several fuel lines 4 as well as, in each case, closeable tank openings 5 and 6 are provided for each tank 1, 2.

The connection arrangement according the invention shown in detail in FIG. 2 comprises a first connecting element 8, a second connecting element 18 as well as a latching device configured as a spring 16.

As shown in FIG. 2, the first connecting element 8 consists of a cylindrical or tubular area 8a, a flange 8b and a stop 8c that is formed on the outside of the tubular area 8a. Here, the first connecting element 8 is attached to a fitting 7 of the first tank 1 by means of several bolts 9 and nuts 10. A flexible tank pouch of the first tank 1 is attached to the fitting 7, for instance, by means of vulcanization. Between the rubber fitting 7 and the first connecting element 8, there is a sealing lip 15 that serves to prevent fuel from escaping.

As can also be seen in FIG. 2, the rubber fitting 7, in turn, is attached to the rib 3 by means of a screw 11 and a threaded connection 12 fitted with an O-ring 13 for sealing. For this purpose, an insert 14 has been placed into the rib 3.

The second flexible tank 2 likewise comprises a flexible tank pouch as well as a second connecting element 18. Here, the tank pouch is vulcanized directly onto the second connecting element 18. In this context, the tank pouch is attached to the second connecting element 18 in such a way that the latter projects into the inside of the flexible tank 2. This makes it possible for the tank pouch of the second tank 2 to lie directly against the rib 3 so that the installation space available can be completely occupied by the flexible tank 2. The second connecting element 18 has an essentially tubular shape and an inner annular recess that can be created, for example, by deformation and it is fitted with another O-ring 19. The O-ring 19 serves to create a seal between the first and the second connecting elements 8 and 18.

As can be seen in FIG. 2, the spring 16 is configured with an undercut 17 that, in the installed state, prevents the second connecting element 18 from becoming detached of its own accord from the first connecting element 8. The broken lines in FIG. 2 depict the second flexible tank 2' with the second connecting element 18' in the uninstalled state. Moreover, the broken lines show the position of the compressed springs 16' so as to allow the installation of the two flexible tanks. As shown in FIG. 2, the two springs 16 are arranged across from each other by 180° on the first connecting element 8 and they are made, for instance, of spring steel or plastic.

The installation of the two flexible tanks 1, 2 is done as follows: as shown in FIG. 2, a guiding bevel facing the outside has been formed on the spring 16. This makes it possible to easily slip the second connecting element 18 onto the first connecting element 8, a process in which the guiding bevel causes both springs 16 to assume the position indicated by the reference numeral 16' and depicted by the broken line. Once the second connecting element has been completely slipped over the two springs 16, the elastic force of the spring returns it to its initial position so that the second connecting element 18 cannot become detached of its own accord from the first connecting element 8. In this case, the second connecting element 18 comes to rest against the stop 8c of the first connecting element 8. Preferably, the springs 16 are configured in such a way that, in their installed state, there can be no play between the first and the second connecting elements 8, 18 in the axial direction.

In order to once again undo the connection between the two flexible tanks 1 and 2, both springs 16 have to be pressed towards the inside in the arrow direction indicated by the letter R so as to be brought into the position 16' indicated by the broken line. Here, pressure can easily be exerted simultaneously onto the two springs 16 from the outside of the tank pouch of the second tank 2, for instance, by using the thumb and the index finger. Owing to the arrangement of the latching device on the inside of the second tank 2, the springs 16 cannot be seen directly but they can easily be felt through the tank pouch of the second tank 2. This makes it possible to easily and rapidly remove the second flexible tank 2 from the first flexible tank 1.

Moreover, the connection arrangement according to the invention can be realized with very few components that are also light in weight. Here, it is especially preferred for the first and the second connecting elements 8 and 18 to be made of aluminum. This accounts for an especially low overall weight of the connection arrangement, an aspect that is particularly advantageous when it comes to aircraft. Moreover, the arrangement of the second connecting element 18 facing the inside of the second tank 2 allows full utilization of the installation space available (see FIG. 2). The connection arrangement according to the invention is particularly well suited for use in helicopters.

What is claimed is:

1. A connection arrangement for detachably connecting a first flexible tank and a second flexible tank of an aircraft, comprising:

a latching device;

a first tubular connecting element attached to the first flexible tank; and a second tubular connecting element attached to the second flexible tank, the first and the second connecting elements being detachably connected to each other using the latching device, wherein the latching device is disposed radially inside of the first tubular connecting element, wherein, in a connected state of the connecting elements, the first and the second tanks are in fluid communication with each other via the first and the second connecting elements, the first tubular connecting element projects into an inside of the second flexible tank, and the latching device is disposed inside one of the first and second flexible tanks so as to be actuatable from outside the respective flexible tank through said respective flexible tank without opening said respective flexible tank.

2. A connection arrangement for detachably connecting a first flexible tank and a second flexible tank of an aircraft, comprising:

a latching device;

a first tubular connecting element defining a first axis, having a first mating wall parallel to the first axis and being attached to the frist flexible tank;

a second tubular connecting element defining a second axis, having a second mating wall parallel to the second axis, and being attached to the second flexible tank, one of the first and the second tubular connecting elements such that sliding contact occurs between the first and second mating walls and being detachably connected to the other of the first and second tubular connecting elements by the latching device; and wherein, in a connected state of the connecting elements, the first and the second tanks are in fluid communication with each other via the first and the second tubular connecting elements and the latching device is disposed inside one of the first and second flexible tanks so as to be actuable from outside the respective flexible tank through said respective flexible tank without opening said respective flexible tank.

3. The connection arrangement as recited in claim 2, wherein in the connected state, the first tubular connecting element projects into an inside of the second flexible tank.

4. The connection arrangement as recited in claim 1, wherein the latching device is arranged at the first tubular connecting element.

5. The connection arrangement as recited in claim 2, wherein the latching device includes a first spring element.

6. The connection arrangement as recited in claim 5, wherein the latching device includes a second spring element, the first and second spring elements attached to the first tubular connecting element and positioned across from each other at an angle of 180°.

7. The connection arrangement as recited in claim 2, wherein the first flexible tank includes a rubber fitting and the first tubular connecting element includes an attachment flange for attaching to the rubber fitting.

8. The connection arrangement as recited in claim 2, the first flexible tank is directly attached to the first tubular connecting element.

9. The connection arrangement as recited in claim 2, further comprising a rib element separating the first flexible tank and the second flexible tank.

10. The connection arrangement as recited in claim 2, the second flexible tank is directly attached to the second tubular connecting element.

11. The connection arrangement as recited in claim 2, wherein the second tubular connecting element projects into an inside of the second tank.

12. The connection arrangement as recited in claim 2, further comprising a sealing element disposed between the first and the second tubular connecting elements.

13. The connection arrangement as recited in claim 12, wherein the sealing element is an O-ring.

14. The connection arrangement as recited in claim 2, wherein each of the first and second tubular connecting elements is integrally formed as a single component.

* * * * *